United States Patent [19]

Sumilas et al.

[11] 3,753,244

[45] Aug. 14, 1973

[54] YIELD ENHANCEMENT REDUNDANCY TECHNIQUE

[75] Inventors: John W. Sumilas, Williston; Norbert G. Vogl, Jr., Colchester, both of Vt.

[73] Assignee: International Business Machines Corporation, Armonk, N.Y.

[22] Filed: Aug. 18, 1971

[21] Appl. No.: 172,800

[52] U.S. Cl. .......................... 340/172.5, 340/173 SP

[51] Int. Cl. .......................... G06f 13/00

[58] Field of Search .................. 340/172.5, 173 SP, 340/174 ED; 307/215, 218, 303

[56] References Cited

UNITED STATES PATENTS

| | | | |
|---|---|---|---|
| 3,633,175 | 1/1972 | Harper | 340/172.5 |
| 3,422,402 | 1/1969 | Sakalay | 340/172.5 |
| 3,588,830 | 6/1971 | Duda et al. | 340/172.5 |
| 3,222,653 | 12/1965 | Rice | 340/172.5 |
| 3,245,051 | 4/1966 | Robb | 340/173 SP |
| 3,434,116 | 3/1969 | Anacker | 340/172.5 |
| 3,654,610 | 4/1972 | Sander et al. | 340/172.5 |

OTHER PUBLICATIONS

Dewitt et al., Memory Array, June 1967, page 95, IBM Technical Disclosure Bulletin.

*Primary Examiner*—Harvey E. Springborn
*Attorney*—Francis J. Thornton et al.

[57] ABSTRACT

A memory storage system utilizing a plurality of storage devices, each of which contains redundancy and each of which is functionally organized on e.g. a single semiconductor chip with its own decoders. This redundancy in each device is provided by placing an extra line of cells on the chip together with a defective address store and a comparator circuit for disabling a defective line of cells and replacing it with the extra line of cells.

7 Claims, 2 Drawing Figures

INVENTORS
JOHN W. SUMILAS
NORBERT G. VOGL, JR.
BY Francis J. Thornton
ATTORNEY

YIELD ENHANCEMENT REDUNDANCY TECHNIQUE

BACKGROUND OF THE INVENTION

1. Field of the Invention

This invention relates to a memory storage system and more particularly to a memory storage system that will operate in reliable manner, even though the storage devices forming the system contain defective bits.

2. Description of the Prior Art

Numerous schemes have been proposed for causing bypass connections to be established automatically around defective bit cells during the normal operations of the memory or automatically performing some equivalent corrective operation without interrupting the fixed memory wiring.

U.S. Pat. No. 3,222,653 shows means for storing the address of an auxiliary memory location within a section of the detective memory location itself if there is room for such storage in the defective memory location. The defective memory location is tagged and, when the latter is read out, the computer which employs such a defective memory location can immediately go to the address, stored in the memory, to fetch a corrected word from an auxiliary memory. The patent further teaches means for storing both the address of a defective memory location and the address of an auxiliary memory location storing the corrected word in a matching register; such that, during subsequent readout of the defective memory location, the content of such matching register was compared with a standard register in order to find a location in the auxiliary memory that contained a word substitutable for the defective word in the memory.

U.S. Pat. No. 3,434,116 teaches dividing each word line of a bulk memory into a large number of subword cells for replacement purposes and employing a small read only memory for registering the location of the defective subword cell groups in the bulk memory, as well as for registering the location of alternative subword cell groups in a replacement memory, whereby it is possible to compensate for all of the bad bits that are expected to occur in the bulk memory by providing a replacement memory which has a bit storage capacity equal to the expected number of bad bits. When a word line containing a subword with one or more bits is addressed, the read only memory automatically selects from the replacement memory a good subword cell group and causes the same to be substituted for the bad subword cell group.

U.S. Pat. No. 3,422,402 sets forth still another arrangement which involves, by means of indirect memory addressing, the use of large read only memory in which there is one bit word for each main memory word. This system includes a main memory, a first memory address register for selecting address location in the main memory, a second memory address register with substitute address locations connected to the main memory, and a read only memory device adapted to be substituted for bad addresses in the main memory. A decoder is used for directing an address with defective bits into a substitute position of the read only memory and out to the second register in the substitute address locations for corrected interrogation of the main memory.

SUMMARY OF THE INVENTION

The present invention teaches a memory storage system utilizing storage arrays each of which has incorporated therein an additional redundant or alternate group of cells, which may be substituted for a defective line in the array.

The present invention, in particular, deals with the arrangement of memory addresses to correct for defective location in the memory array. This is accomplished when the memory array is made larger than necessary to provide an extra line which can be substituted for a word line containing defective locations. A comparator is supplied so that defective locations are never addressed. In operation, the address input to the memory system is compared to a defect address stored in a read only memory. If the address input is for a word line containing a defective location, the output of the comparator disables via line decoders the entire memory array except for the redundant line, which is then substituted for the line containing the defective location.

If the address input is for a word line that does not contain a defective location, the comparator is arranged so as not to disable the line decoders and the address is fed directly through the addressed line decoder to its normal storage location.

The technique of the present invention thus requires that each input address be compared with the address of any defective line stored in a read only memory, which contains but one word describing one address of one defective address in each semiconductor array comprising the memory.

An object of the present invention is to provide improved memory system, which is capable of reliable operations even though defective locations are contained in the semiconductor arrays used to comprise the memory.

Another object of the invention is to provide improved memory systems capable of automatically accommodating for defective memory bit locations.

Still another object of the invention is to provide an improved memory system adapted to use monolithic semi-conductor arrays containing bad bits.

The foregoing and objects, features and advantages of the invention will be apparent from the following more particular description of the preferred embodiments of the invention taken in conjunction with the accompanying drawing.

DESCRIPTION OF THE PREFERRED EMBODIMENT

Figure 1:
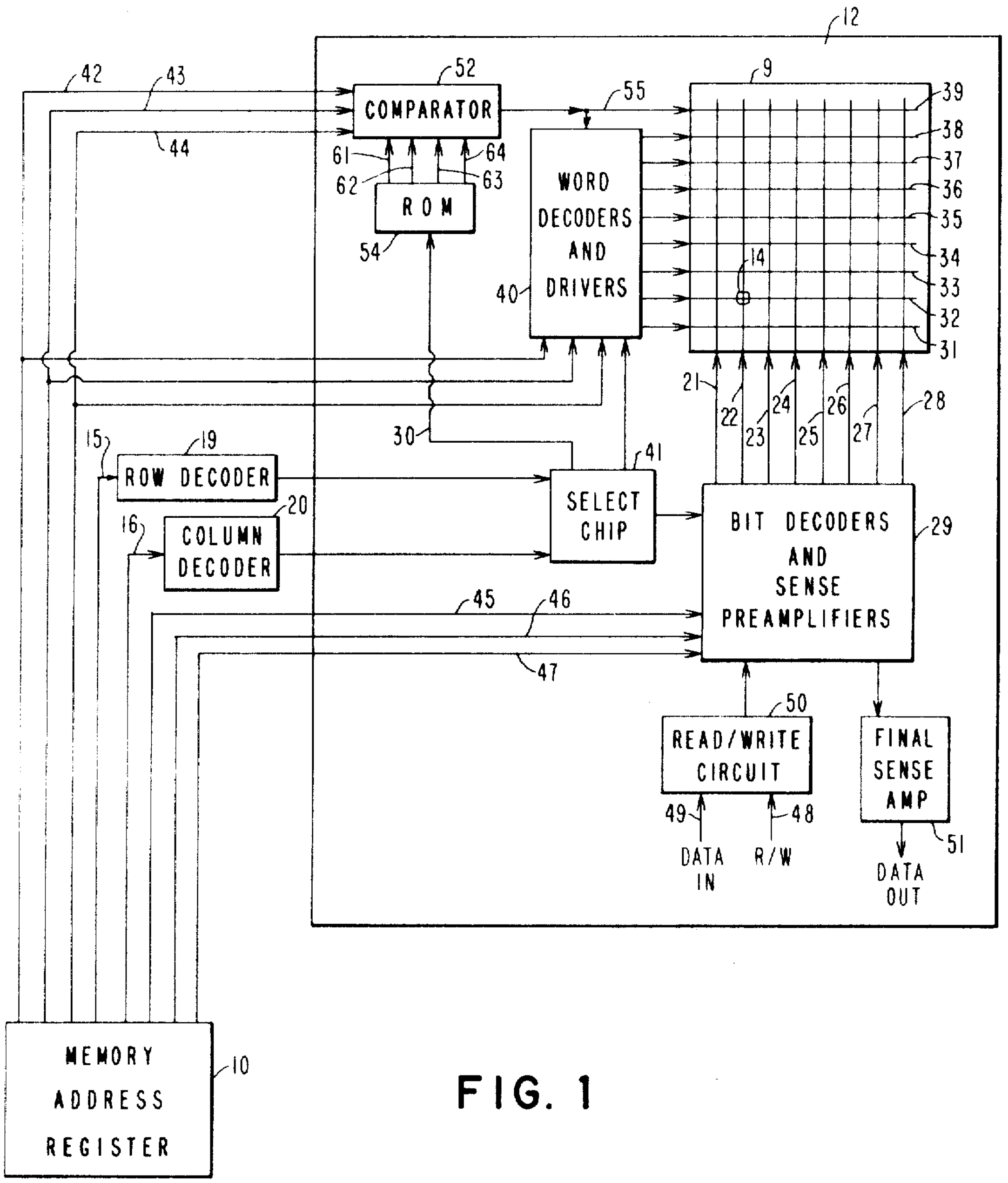
FIG. 1 is a diagramatic illustration of a simple memory system employing the concepts of the present invention.

A memory system incorporating the present invention in a memory array is schematically illustrated in FIG. 1. The system shown achieves the objects of the invention by adding to each semiconductor chip, forming the array, an extra line of storage locations, thereby providing extra storage locations in the chip which can be used to replace one other line containing a defective storage location, and a comparator for re-directing an address, initially directed to a line containing the defective storage position, to the extra line. Such memory systems, in general, comprise a plurality of storage cards (not shown) mounted on a memory board (not shown). The memory is addressed by means of an address stored in an address register 10 from which extend a sufficient number of address lines to serve each storage card.

Although in practice there are preferable many such storage cards mounted on the memory board and each storage card usually comprises a plurality of modules containing a number of chips 12, only one such chip 12 need be discussed at this time to describe the present invention. The address lines drive all chips, in all modules, on all cards, in the following manner: selected address lines 15 are fed into a row decoder 19 on each storage card where the signals of the lines are decoded to select one row of chips upon the card. Each output line of the row decoder drives but one chip in each row of modules. Other address lines 16 extend to a column decoder 20 to select one column of chips on the card. Each output line of the column decoder 20 drives all chips within the respective column of modules. When there is a coincidence between the row address and the column address, determined by a chip select circuit 41 into which they are fed, then only one chip is selected and powered up for a read or write cycle.

Each chip 12, as shown in FIG. 1, has built therein an array 9 of storage locations and in accordance with the present invention and comprises seventy-two storage locations or storage cells 14, which are in one direction, collected into eight bit lines, 21 through 28, and in another direction orthogonal to the first direction collected into nine word lines, 31 through 39. The eight bit lines are coupled into a series of bit decoders and sense preamplifiers 29. The first eight word lines 31 through 38 are coupled into a series of word decoders and drivers 40 while the ninth word line 39 is coupled, via lead 55 to the word decoders and drivers 40 and to a comparator 52.

Normally such chips are fabricated with even numbers of word lines and bit lines. Thus the 64 storage cells connected to the first eight word lines comprises a main group of cells while the other eight cells coupled to the ninth word line comprise a redundant or extra line. The cells forming this redundant line are, in accordance with the invention, available for substitution in place of a failing line in the main group of cells.

Following the fabrication of a chip with such a redundant word line thereon, it is tested before it is mounted into the modules and used in the memory system. During the final test sequence, such chips are sorted depending on whether or not they have defective cells therein.

Initially, only the first eight word lines 31 through 38 are tested. If all cells in these word lines are good, the chip is immediately usable.

If any one of these first eight word lines, 31 through 38, is defective in itself or contains a defective cell, the ninth word line 39 is tested. If the ninth line is good, the chip is usable but only after the address of the word line containing the defect is written into and stored in a read only memory (ROM) 54 coupled to the comparator 52 via leads 61, 62, 63 & 64.

The ROM 54 used with the present invention is a one word ROM powered by the chip select circuit 41, such that when the chip select powers up the chip 12, it will also power up the ROM via lead 30 so that the ROM provides a constant output to the comparator during the chip addressing cycle.

In this example if there are defective cells in two or more word lines, the entire chip is unusable and is discarded.

If the particular chip selected by the coincidence between the row and column addresses and switched to a high power state contains all good cells in the first eight words lines, the memory system operates as follows: following activation of the chip into a high power state, the word decoders and drivers 40 are activated by signals on address lines 42, 43 and 44 and the bit decoders 29 are simultaneously activated by signals on address lines 45, 46 and 47. The signals on address lines 42, 43 and 44, sent to the word decoders and drivers 40, are decoded such that one and only one of the eight word lines 31 through 38 is selected and driven.

Signals of the three bit addresses lines 45, 46 and 47 are sent to the bit decoder 29 where they are decoded and used to activate and drive a selected one of the eight bit lines, 21 through 28. The coincidence of the applied power to the selected word line and the selected bit line selects one particular cell at the intersection of both lines.

The word address lines 42, 43 and 44 are also connected to the comparator 52. Since, however, in this case no defective address is stored in the ROM 54, the comparator 52 is not activated and the word decoders and drivers 40 operate in their normal manner.

Data is stored in the selected storage cell by the coincidence of a write pulse on input 48 of a read-write circuit 50 together with a data input pulse on input 49. This coincidence conditions one of the eight bit lines, which has been decoded by the three address lines and the data is directed into the selected decoded storage cell by the selected bit line.

When only a read pulse is present on an input 48 the condition of the selected storage cell is read and the state of the cell detected by a sense amplifier in bit decoder circuit 29 and fed to a final sense amplifier 51, which in turn sends data out to the storage card.

Additional details of such chip array decoders, sense preamplifiers, amplifiers and other circuitry are well known to those skilled in the art.

If the particular chip selected by the row and column addresses were one of the second group selected at final test; e.g., contains one or more defective cells in the first eight word lines, the memory system operates as follows:

Following activation of the chip into a high power state, the word decoders and drivers 40 are activated by signals on the address lines 42, 43 and 44 and the bit decoders 29 are simultaneously activated by signals on the address lines 45, 46 and 47. Thus once again a single selected cell in the array is addressed in exactly the same way that the cell in the totally good chip was addressed.

Again, the signals on word address lines 42, 43 and 44 are simultaneously sent to the comparator 52. Now, however, there is stored in the ROM 54, the address of the word line containing the defective cell. If the input address to the comparator, from the memory address register, via leads 42, 43 and 44 compares with the bad address retrived from the ROM, via leads 62, 63 and 64, the comparator 52 disenables the word decoders and drivers 40 via lead 55 and activates the redundant line 39 on the chip 12.

Data can now be stored into or readout of the redundant line 39 exactly as if it were the originally addressed line.

If the input, via leads 42, 43 and 44, is associated with a good bit address, the comparator 52 is not activated since the input address and the ROM stored defective address do not compare. Thus the word decoder 40 is not deactivated and continues to operate in its normal fashion.

In summary, the disclosed invention involves the addition of an extra word (or bit) line to a memory array which is functionally organized with its own decoders. An input address of (n) binary bits is functionally decoded to access one sector of the chip which previously had been tested and the address of any defective sector is stored in a ROM feeding a comparator. The defective address store of the ROM is $(n+1)$ where $(n+1)$ is the binary bits necessary to control the comparator and activate the redundant line, if necessary.

The incoming chip address is compared to the stored defective address. If they match, the decoders for all word lines, are disabled and the extra line on the chip addressed. If the compared addresses do not match the input, the address signals are coded in the normal manner and the originally addressed line is selected. Thus address signals to good lines are unaffected but an address signal directed to a defective line will be switched to the extra line.

Figure 2:
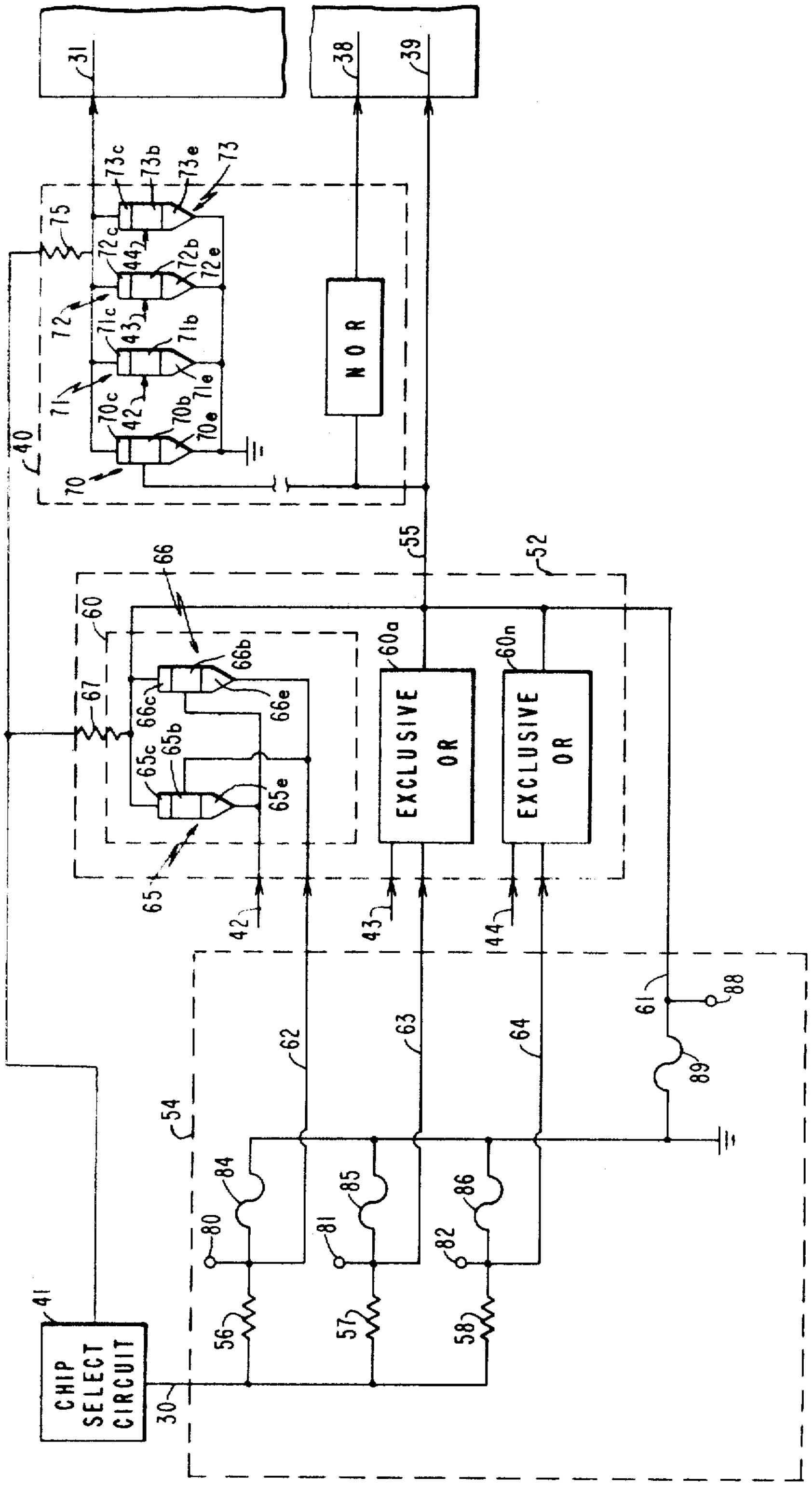
FIG. 2 schematically details the logic function of the invention in bipolar technology.

FIG. 2 shows the logic function of the invention as it is performed with bipolar technology. The ROM, powered by the chip select circuit 41 via lead 30, comprises a series of resistors 56, 57 and 58 each connected between lead 30 and leads 62, 63 and 64, respectively. Each resistor 56, 57 and 58 is also connected, respectively to input leads 80, 81 and 82 and to ground through a respective fuse 84, 85 and 86. The fourth line 61 leading from the ROM to the comparator is connected to an input lead 88 and to ground through a fuse 89. The comparator 52 is composed of a series of exclusive OR circuits 60, 60*a* and 60*n*, each of which respectively has an input line 42, 43 and 44, from the memory address register 10, an input line 62, 63 and 64, from the ROM 54, and a common output line 55 to which is connected the lead 61 from ROM 54 and the word decoders and drivers 40. Each exclusive OR circuit, of the comparator 52, comprises a pair of cross-coupled transistors. The collector of each transistor, in each exclusive OR circuit, is connected to a voltage source i.e. the chip select circuit 41 through a resistor 67, to the word decoders and drivers 40 and to the redundant word line 39, while the emitters are cross-coupled to the base of the adjacent transistor and to an input line 42, 43, 44, 62, 63 or 64.

For convenience only, only one such circuit will be described. For example, the two transistors 65 and 66 forming exclusive OR 60 have their collectors 65*c* and 66*c* coupled to the voltage source +V, to the word decoders and drivers 40 and to the redundant line 39. The base 65*b* of transistor 65 is connected to the emitter 66*e* of transistor 66 and to the input line 62. The base 66*b* of transistor 66 is connected to the emitter 65*e* of transistor 65 and to the input line 42.

The word decoders and drivers 40 are conventional and comprise a series of negative OR circuits whose inputs are connected to the output 55 of the comparator 52 and whose outputs are coupled to the word lines 31 through 38.

Again, for convenience only, only one section of the decoder will be described in detail. Thus for example, each decoder circuit of the present invention comprises four transistors 70, 71, 72 and 73. The collectors 70*c*, 71*c*, 72*c* and 73*c* of these transistors are connected in common to a positive voltage source i.e. the chip select circuit 41 through a resistor 75 and coupled to word line 31. The emitters 70*e*, 71*e*, 72*e* and 73*e* are also connected in common and to ground. The base 70*e* of transistor 70 is connected via lead 55 to the comparator output and to lead 61 from the ROM, while the bases 71*e*, 72*e* and 73*e* are respectively coupled to the word address lines 42, 43 and 44.

The following two situations will fully describe the operation of these illustrative circuits.

If it is assumed that the word lines address are as set out below:

| Word Line | Address |
|---|---|
| 31 | 000 |
| 32 | 001 |
| 33 | 010 |
| 34 | 011 |
| 35 | 100 |
| 36 | 101 |
| 37 | 110 |
| 38 | 111 |

and it is further assumed line 36 is defective then this address is stored in the ROM 54 by applying a bias between the pads 80, 82 and 88 and ground sufficient to flow fuses 84, 86 and 89. This causes leads 62 and 64 to be disengaged from ground and connected through the respective resistor 56 and 58 to the lead 30 which is raised to a positive voltage level by the chip select circuit 41.

Application of the same voltage to both leads of the exclusive OR circuits in the comparator 52, causes the circuits to be turned off and the output lead 55 to rise to the high positive level of voltage source +V, which is connected to lead 55 through resistor 67, whereupon transistor 70 turns on to ground the collector of all the decode transistors 71, 72 and 73. When so grounded, these transistors become insensitive to the address signals applied to their bases. Because the output 55 is connected to each NOR forming the decoder, all the decode circuits become disenabled and all the word lines 31 through 38 become connected to ground and insensitive to the inputs from the memory address register.

This positive voltage on lead 55 also causes the redundant word line 39 to be activated.

In the case where no line in the first eight word lines is defective, the ROM is not changed and each fuze therein is left intact. In this case, the output lead 55 of the comparator 52 and thus the base 70B of transistor 70 is connected directly to ground through fuze 89. When the base 70B is so connected to ground transistor 70 is turned off, the word line 31 is isolated from ground and the decode transistors 71, 72 and 73 will be responsive to any signals applied to their bases via leads 42, 43 and 44. Also since word line 39 is also connected directly to ground through lead 61 and fuze 89, it remains inactive.

The present invention can be extended by providing more than one redundant line on the chip together with a comparator for each redundant line so added and an m way OR circuit where m is the number of redundant lines and comparators so added.

While the invention has been particularly shown and described with reference to the preferred embodiment thereof, it will be understood by those skilled in the art that various changes in form and details of the device and the method of making it may be made therein without departing from the spirit and scope of the invention.

What is claimed is:

1. A memory storage system comprising a main memory means for storing data in storage cells wherein at least one of said storage cells is a defective cell,
   a decoder circuit coupled to said main memory means,
   comparator means,
   memory address register means for applying first addressing signals to said decoder circuit and to said comparator means,
   read only memory means for applying second addressing signals, indicative of the location of said defective cell in said main memory, to said comparator means, and
   alternate data storage means,
   said comparator means responsive to said first addressing signals and second addressing signals for applying a pulse to said decoder circuit and to said alternate data storage means when said first addressing signals and second addressing signals match,
   said decoder circuit containing inhibiting means controlled by said pulse to prevent said circuit from producing an addressing output to said storage cells when said first and second signals match.

2. The memory storage system of claim 1 wherein said main memory means comprises a plurality of semiconductor integrated circuit chips, each of said chips having therein said alternate data storage means.

3. The memory storage system of claim 2 wherein said semiconductor circuit chip further has formed therein
   said decoder circuit, a set of bit decode circuits coupled to said main memory means, said read only memory means, and said comparator means.

4. The memory system of claim 1 wherein said comparator means responsive to said first address signals and said second addressing signals comprises
   a series of exclusive OR circuits,
   each of said exclusive OR circuits having an input coupled to the address register means an input coupled to the read only memory means, and an output coupled to said decoder circuit.

5. The memory system of claim 3 wherein said decoder circuit comprises a series of NOR circuits.

6. The memory system of claim 1 wherein said read only memory means contains an address store of $n+1$ binary bits where n is the number of binary bits in the first address signal of the memory address register, the extra binary bit being used to disable the alternate data storage means.

7. The memory system of claim 6 wherein said read only memory means is coupled to said comparator means and to a power source and includes a plurality of fusable means therein which can be permanently blown by said power source to indicate a defective address.

* * * * *